(12) United States Patent
Lischiner et al.

(10) Patent No.: US 10,550,331 B2
(45) Date of Patent: Feb. 4, 2020

(54) METHOD OF PRODUCING AROMATIC HYDROCARBON CONCENTRATE FROM LIGHT ALIPHATIC HYDROCARBONS, AND INSTALLATION FOR IMPLEMENTING SAME

(71) Applicant: NGT GLOBAL AG, INC., Zug (CH)

(72) Inventors: Joseph Izrailevich Lischiner, Moscow (RU); Olga Vasilyevna Malova, Moscow (RU); Andrey Leonidovich Tarasov, Moscow (RU); Denis Vasilyevich Pchelintsev, Mosco (RU); Vladimir Vladislavovich Imshenetskiy, Moskovskaya obl (RU)

(73) Assignee: NGT Global AG, Zug (CH)

( * ) Notice: Subject to any disclaimer, the term of this patent is extended or adjusted under 35 U.S.C. 154(b) by 0 days.

(21) Appl. No.: 15/129,662

(22) PCT Filed: Mar. 25, 2015

(86) PCT No.: PCT/RU2015/000171
§ 371 (c)(1),
(2) Date: Sep. 27, 2016

(87) PCT Pub. No.: WO2015/147700
PCT Pub. Date: Oct. 1, 2015

(65) Prior Publication Data
US 2017/0145317 A1    May 25, 2017

(30) Foreign Application Priority Data

Mar. 28, 2014  (RU) .................................. 2014111985

(51) Int. Cl.
*C10G 3/00*        (2006.01)
*C10G 35/095*   (2006.01)
(Continued)

(52) U.S. Cl.
CPC .................. *C10G 3/49* (2013.01); *C10G 3/52* (2013.01); *C10G 35/095* (2013.01); *C10G 45/68* (2013.01);
(Continued)

(58) Field of Classification Search
CPC ... C10G 3/00; C10G 3/42; C10G 3/44; C10G 3/48; C10G 3/49–3/52; C10G 35/04;
(Continued)

(56) References Cited

U.S. PATENT DOCUMENTS 3,702,886  A    11/1972   Argauer
3,756,942  A     9/1973   Cattanach
(Continued)

FOREIGN PATENT DOCUMENTS

EP       103117 A1       7/1982
RU       2160161         6/2005
(Continued)

OTHER PUBLICATIONS

International Search report PCT/RU2015/000171.
(Continued)

*Primary Examiner* — Natasha E Young
(74) *Attorney, Agent, or Firm* — Glen P. Belvis; Belvis Law, LLC.

(57) ABSTRACT

A method and an installation for producing a concentrate of aromatic hydrocarbons from light aliphatic hydrocarbons and from mixtures thereof with oxygenates. Initial raw material is fed into two in-series-connected reaction units, with zeolite catalysts a mixture obtained following the reaction units is separated into a liquid fraction and a gas fraction, and the gas fraction is fed to the inlet of the first and second reaction unit. The method is characterized in that the gas fraction obtained following the reaction units is separated into a hydrogen-containing gas and into a broad
(Continued)

fraction of light hydrocarbons, containing olefins, and in that the hydrogen-containing gas is fed into an oxygenate synthesis unit, in that the resultant oxygenates are fed to the inlet of the first and second reaction unit, and in that the broad fraction of light hydrocarbons, containing olefins, is fed to the inlet of the first reaction unit.

6 Claims, 2 Drawing Sheets

(51) Int. Cl.
    *C10G 45/68*     (2006.01)
    *C10G 63/02*     (2006.01)
    *B01J 19/24*     (2006.01)

(52) U.S. Cl.
    CPC .......... *C10G 63/02* (2013.01); *C10G 2400/30* (2013.01); *Y02P 30/20* (2015.11)

(58) Field of Classification Search
    CPC ...... C10G 35/06; C10G 35/095; C10G 45/00; C10G 45/58; C10G 45/68; C10G 63/00; C10G 63/02; C10G 2400/30; C10G 35/00; Y02P 30/00; Y02P 30/20; B01J 19/00; B01J 19/24; B01J 2219/24
    See application file for complete search history.

(56) References Cited

U.S. PATENT DOCUMENTS

| | | |
|---|---|---|
| 3,911,041 A | 10/1975 | Kaeding et al. |
| 3,941,871 A | 3/1976 | Dwyer et al. |
| 3,957,621 A * | 5/1976 | Bonacci ............... C10G 45/64 208/111.15 |
| 4,159,282 A | 6/1979 | Olson et al. |
| 4,211,640 A | 7/1980 | Garwood et al. |
| 4,227,992 A | 10/1980 | Garwood et al. |
| 4,356,338 A | 10/1982 | Young |
| 4,456,527 A | 6/1984 | Buss et al. |
| 4,463,204 A | 7/1984 | Liu |
| 4,465,886 A | 8/1984 | Rodewald |
| 4,499,314 A | 2/1985 | Seddon et al. |
| 4,523,049 A | 6/1985 | Jones et al. |
| 4,554,260 A | 11/1985 | Pieters et al. |
| 4,590,321 A | 5/1986 | Chu |
| 4,720,602 A | 1/1988 | Chu |
| 4,853,202 A | 8/1989 | Kuznicki |
| 4,899,011 A | 2/1990 | Chu et al. |
| 4,963,337 A | 10/1990 | Zones |
| 5,030,782 A * | 7/1991 | Harandi ............... C07C 4/06 585/322 |
| 5,108,579 A | 4/1992 | Casci |
| 5,173,461 A | 12/1992 | Absil et al. |
| 5,178,748 A | 1/1993 | Casci et al. |
| 5,306,411 A | 4/1994 | Mazanec et al. |
| 5,321,183 A | 6/1994 | Chang et al. |
| 5,362,697 A | 11/1994 | Fung et al. |
| 5,365,003 A | 11/1994 | Chang et al. |
| 5,453,554 A | 9/1995 | Cheng et al. |
| 5,498,814 A | 3/1996 | Chang et al. |
| 5,516,736 A | 5/1996 | Chang et al. |
| 5,536,894 A | 7/1996 | Degnan et al. |
| 5,557,024 A | 9/1996 | Cheng et al. |
| 5,935,897 A | 8/1999 | Trubenbach et al. |
| 5,993,642 A | 11/1999 | Mohr et al. |
| 6,046,372 A | 4/2000 | Brown et al. |
| 6,063,724 A | 5/2000 | Resasco et al. |
| 6,096,193 A | 8/2000 | Resasco et al. |
| 6,143,166 A | 11/2000 | Nacamuli |
| 6,413,898 B1 | 7/2002 | Faber et al. |
| 6,423,879 B1 | 7/2002 | Brown et al. |
| 6,504,072 B1 | 1/2003 | Brown et al. |
| 6,635,792 B2 | 10/2003 | Choi et al. |
| 6,906,232 B2 | 6/2005 | Levin et al. |
| 6,995,111 B2 | 2/2006 | Levin et al. |
| 7,026,263 B2 | 4/2006 | Le Van Mao |
| 7,078,578 B2 | 7/2006 | Janssens et al. |
| 7,122,492 B2 | 10/2006 | Ou et al. |
| 7,122,493 B2 | 10/2006 | Ou et al. |
| 7,164,052 B2 | 1/2007 | Carati et al. |
| 7,208,442 B2 | 4/2007 | Xu et al. |
| 7,419,930 B2 | 9/2008 | Carati et al. |
| 7,700,816 B2 | 4/2010 | Xu et al. |
| 7,923,399 B2 | 4/2011 | Long et al. |
| 8,226,740 B2 | 7/2012 | Chaumonnot et al. |
| 8,338,655 B2 | 12/2012 | Chang |
| 9,040,003 B2 | 5/2015 | Andersen et al. |
| 2004/0192990 A1 * | 9/2004 | Choudhary ............... C07C 1/20 585/638 |
| 2008/0027255 A1 | 1/2008 | Blessing et al. |
| 2008/0051617 A1 * | 2/2008 | Sangar ...................... C07C 2/76 585/403 |
| 2008/0300434 A1 | 12/2008 | Cortright |
| 2008/0300435 A1 | 12/2008 | Cortright |
| 2009/0288990 A1 | 11/2009 | Xie et al. |
| 2010/0145127 A1 | 6/2010 | Xie et al. |
| 2010/0185033 A1 * | 7/2010 | Karim ..................... B01J 29/405 585/408 |
| 2011/0112347 A1 * | 5/2011 | Van Den Berg .......... C01B 3/12 585/324 |
| 2011/0118518 A1 * | 5/2011 | Nesterenko .............. B01J 21/16 585/329 |
| 2013/0066126 A1 | 3/2013 | Jana |
| 2013/0317269 A1 | 11/2013 | Nesterenko et al. |
| 2014/0018592 A1 | 1/2014 | Chen et al. |
| 2014/0058180 A1 | 2/2014 | Klingelhofer et al. |
| 2014/0100404 A1 | 4/2014 | Narula et al. |
| 2014/0256010 A1 | 9/2014 | Narula et al. |
| 2014/0273146 A1 | 9/2014 | Narula et al. |
| 2014/0322781 A1 | 10/2014 | Narula et al. |
| 2017/0001922 A1 | 1/2017 | Lishchiner et al. |
| 2017/0007992 A1 | 1/2017 | Lishchiner et al. |
| 2017/0145317 A1 | 5/2017 | Lischiner et al. |
| 2017/0233311 A1 | 8/2017 | Vladislavovich et al. |
| 2019/0100477 A1 | 4/2019 | Lishchiner et al. |

FOREIGN PATENT DOCUMENTS

| | | |
|---|---|---|
| RU | 2284343 | 6/2005 |
| RU | 2289477 | 12/2006 |
| RU | 2293056 | 2/2007 |
| RU | 2294799 | 3/2007 |
| RU | 2362760 | 2/2008 |
| RU | 2320631 | 3/2008 |
| RU | 2323777 | 5/2008 |
| RU | 2333033 | 9/2008 |
| RU | 2349567 | 3/2009 |
| RU | 2349568 | 3/2009 |
| RU | 2350591 | 3/2009 |
| RU | 2350592 | 3/2009 |
| RU | 2354638 | 5/2009 |
| RU | 2354639 | 5/2009 |
| RU | 2433863 | 4/2010 |
| RU | 2391135 | 6/2010 |
| RU | 2429910 | 7/2010 |
| RU | 2009101606 | 7/2010 |
| RU | 2429910 | 9/2011 |
| RU | 2440189 | 1/2012 |
| RU | 2477656 | 2/2012 |
| RU | 2446135 | 3/2012 |
| RU | 2010135608 | 3/2012 |
| RU | 2454388 | 6/2012 |
| RU | 2458898 | 8/2012 |
| RU | 2466976 | 11/2012 |
| RU | 2477656 | 3/2013 |
| RU | 2495017 | 10/2013 |
| RU | 2544017 | 1/2014 |
| RU | 2544241 | 1/2014 |
| RU | 2509759 | 3/2014 |
| RU | 2550354 | 3/2014 |
| RU | 2518091 | 6/2014 |

(56) References Cited

FOREIGN PATENT DOCUMENTS

| | | |
|---|---|---|
| RU | 2558955 | 8/2014 |
| RU | 2549571 | 4/2015 |
| WO | WO 1996/016004 | 5/1996 |
| WO | WO 2008/109877 | 9/2008 |
| WO | WO 2015/115932 | 8/2015 |
| WO | WO 2015/112056 | 9/2015 |
| WO | WO 2015/147700 | 10/2015 |
| WO | WO 2016/024883 | 2/2016 |
| WO | WO 2017/155424 | 9/2017 |

OTHER PUBLICATIONS

Translation of International Search report PCT/RU 2015/000171.
PCT/RU2015/000171 Opinion.
International Application Status Report (IAS).

\* cited by examiner

METHOD OF PRODUCING AROMATIC HYDROCARBON CONCENTRATE FROM LIGHT ALIPHATIC HYDROCARBONS, AND INSTALLATION FOR IMPLEMENTING SAME

This application is a US nationalization pursuant to 35 U.S.C. § 371 of PCT/RU2015/000171, now WO 2015/147700, filed Mar. 25, 2015, which claims priority to RU Patent Application Serial No. 2014111985, filed Mar. 28, 2014, the entire disclosure of each of which is incorporated herein by reference.

AREA OF TECHNOLOGY TO WHICH THE INVENTION BELONGS

The invention belongs to the area of gas chemistry and gas refining, more specifically to methods and devices for producing aromatic hydrocarbon concentrate (AHCC) from light aliphatic hydrocarbons and oxygenated compounds ($C_1$-$C_4$ aliphatic alcohols), in which the feedstock is fed to two serially connected reactors, a first and second with pentasil-based zeolite catalysts, which differ in the conditions of conversion of aliphatic to aromatic hydrocarbons, the mixture obtained from the reactors is separated into liquid and gaseous fractions, and the gaseous fraction is fed to the inputs of the first and second reactors and can be used to produce aromatic hydrocarbons.

As hydrocarbon feedstock containing aliphatic hydrocarbons, the method can use $C_2$-$C_4$ hydrocarbon fractions, including those containing $C_{5+}$ components: propane-butane fractions (PBF), natural gas liquids (NGL), light fractions of natural gas liquids, and straight-run gasolines, as well as light naphtha from the Fischer-Tropsch process, etc. PBF containing up to 60-80% propane by weight are preferable. $C_1$-$C_4$ aliphatic alcohols, including bioethanol and biopropanol, can also be used as feedstock.

Technological Level of the Method

In most prior-art methods of producing aromatic hydrocarbons from light aliphatic feedstock, the stream consists mainly of $C_3$-$C_4$ hydrocarbons, and the feedstock is converted without separation into components in a single reaction zone, under identical conditions, while propane is converted to aromatic hydrocarbons with a high yield at higher temperature than butane or propylene, ethylene, while the conversion of ethane requires still higher temperatures. Therefore, the mixed feedstock is brought into contact with the catalyst either at high temperature, to address the less reactive feedstock components, thereby increasing the coking rate and reducing the catalyst's life, or at lower temperature, with a relatively low degree of propane and ethane conversion, with recycling of the unconverted feedstock.

An investigation of light aliphatic feedstock conversion processes noted that propane conversion proceeds more efficiently at a temperature at least 30° C. higher than that needed for butane conversion. This has been noted in U.S. Pat. No. 5,171,912, which describes a process for producing gasoline from n-butane with conversion of the propane produced in n-butane conversion in a separate reactor, and proposes to separate the butane and propane fractions in a rectification column for recycling.

Patent WO2007053061A2 states that the addition of ~25% olefins to the conversion feedstock permits compensation of the endothermic effect in conversion of saturated aliphatic hydrocarbons (propane and butanes) which permits conversion of aliphatic hydrocarbons to be performed in an adiabatic reactor under near-isothermal conditions.

RF Patent 2477656 describes a method of two-stage methanol conversion in which thermostabilization in both reaction zones is effected by circulation of aliphatic hydrocarbons formed in the synthesis of aromatic hydrocarbons. Circulation is effected at a ratio of seven moles of paraffins ($C_3$-$C_5$) per mole of conversion methanol, which ensures adiabatic conditions in both reaction zones with a 20-30° C. temperature gradient across the catalyst bed.

U.S. Pat. No. 4,642,402 proposes to recycle benzene and/or toluene extracted from the catalyzate at the propane aromatization stage to increase the alkylbenzene yield in the synthesized gasoline.

U.S. Pat. No. 5,043,502 proposes to increase the alkylbenzene yield by using an additional reaction zone where benzene methylation occurs.

These technical solutions have several disadvantages. For example, the tubular reaction furnaces that deliver heat for conversion of $C_3$-$C_4$ light paraffins (Aroforming process described in *Thermal and Catalytic Processes in Petroleum Refining* by Serge Raseev, New York, 2003) are difficult to operate (catalyst loading/unloading) and expensive. Solutions with thermostabilization through feedstock recycling increase the volumes of reactor equipment (the volume of the reaction zones) and increase energy costs through feedstock circulation. In addition, some of the feedstock will inevitably be carried off with the discharge gases from the feedstock fractionation unit, and the quantity of lost feedstock increases with the number of circulation cycles.

Solutions involving the delivery of heat through superheating of the feedstock fed to the reactor cause soot formation in the heating furnace coils, especially when the feedstock contains olefins. In addition, feedstock superheating causes local superheating of the front bed of the catalyst, causing premature aging or deactivation of the catalyst and uneven catalyst activity across the catalyst bed, since the catalyst's activity rises with temperature.

Solutions involving the feeding of paraffin and olefin mixtures (~25%) to the reactor permit use of a simple reactor for conversion and avoidance of local catalyst superheating, and stabilization of catalyst activity across its bed, reducing the volume of the reaction zone, but also have disadvantages related to soot production on olefin heating and require additional outlays for olefin production.

Solutions involving increased propane conversion by increasing the temperature in the second reaction zone simultaneously cause a reduction in arene yield.

The prior art also knows a method of producing aromatic hydrocarbon concentrate from light aliphatic hydrocarbons in which the feedstock is fed to two serially connected reactors, a first and second with pentasil-based zeolite catalysts, where the reactors differ in the conditions of conversion of hydrocarbons to aromatics, the mixture obtained from the reactors is separated into liquid and gaseous fractions, and the gaseous fraction is fed to the inputs of the first and second reactors, as described in RF Patent 2277524, published in 2006.

RF Patent 2277524 proposes to perform conversion of the propane-butane fraction preferably of 80% butanes sequentially in two reactors, the first of which converts predominantly butane, and the second high-temperature reactor converts propane unconverted in the first reactor and other mainly saturated aliphatic hydrocarbons formed during feedstock conversion in the first reactor. This method is most similar in technical essence and achieved technical result and has been selected as the prototype for the claimed invention.

The disadvantage of the method claimed in the prototype invention is its low aromatic hydrocarbon yield and its poor selectivity with respect to alkylbenzenes, in particular xylenes.

Disclosure of the Invention as a Method

The present invention has the principal goal of offering a method of producing AHCC from light aliphatic hydrocarbons and mixtures thereof with oxygenated compounds ($C_1$-$C_4$ aliphatic alcohols) that increases the efficiency of production of aromatic hydrocarbon concentrates and the selectivity with respect to alkylbenzenes, in particular xylenes.

The stated objective is accomplished by separating the gaseous fraction separated from the reaction product, aromatic hydrocarbons, into hydrogen-containing gas and NGL containing olefins. The hydrogen-containing gas is fed to a unit for synthesizing oxygenates (methanol or mixtures thereof with ethers and/or $C_2$-$C_4$ aliphatic alcohols), and the resulting oxygenates are fed to the inputs of the first and second reactors. The olefin-containing NGL are fed to the input of the first reactor. This advantageous characteristic makes it possible to increase the useful yield of aromatic hydrocarbons as a whole and alkylbenzenes produced in aromatic hydrocarbons in particular.

A variant of the invention exists in which oxygenates are synthesized by producing synthesis gas using autothermal reforming technology, with subsequent oxygenate synthesis in a circulating or flow-through scheme. This makes it possible to increase the efficiency of arene concentrate production by involving the oxygenates in the conversion process, increase the alkylbenzene selectivity, and solve the problem of heat delivery to the endothermal reaction of light saturated hydrocarbon aromatization (dehydrocyclization) by parallel conduct of exothermal reactions of oxygenate conversion to aromatic hydrocarbons and alkylation of aromatic hydrocarbons by alcohols in the reaction zone, which permits the conversion of hydrocarbon-oxygenate mixtures to be performed using reactor equipment that does not use elements of heat exchange with the reaction zone in its design.

A variant of the invention exists in which oxygenate synthesis is performed with simultaneous fine purification of discharge hydrogen-containing gas to remove sulfur compounds. This makes it possible to increase the useful product yield through additional purification to remove undesirable impurities containing sulfur compounds, which are catalytic poisons for catalysts of hydrocarbon conversion to synthesis gas and oxygenate synthesis.

A variant of the invention exists in which a temperature of 400-500° C. is maintained in the first reactor and a temperature of 450-520° C. is maintained in the second reactor. This makes it possible to maintain a higher temperature in the second reactor, since the conversion of propane with oxygenates proceeds more efficiently at a temperature at least 15° C. higher than the temperature required for conversion of butanes or 40° C. higher than the temperature required for conversion of butanes with oxygenates.

A variant of the invention exists in which the temperature in the first and second reactors is controlled by the oxygenate flow rate. This makes it possible to control the required temperature by adjusting the oxygenate feed from the oxygenate synthesis unit.

A variant of the invention exists in which the reactor catalyst is a catalyst that contains a mechanical mixture of two zeolites, the first of which is characterized by a silicate modulus $SiO_2/Al_2O_3=20$ and is pretreated with an aqueous alkali solution and modified by rare-earth oxides in quantities of 0.5-2.0% by wt. of the weight of the first zeolite, while the second is characterized by a silicate modulus $SiO_2/Al_2O_3=82$, contains residual quantities of sodium oxide 0.04% by wt. of the weight of the second zeolite, and is modified by magnesium oxide in a quantity of 0.5-5.0% by wt. of the weight of the second zeolite, where the zeolites are used in a mass ratio of 1.7/1 to 2.8/1, and the binder contains at least silica and is used in a quantity of 20-25% by wt. of the weight of the catalyst. This makes it possible, in the co-conversion of hydrocarbons and oxygenates, to achieve a higher yield of aromatic hydrocarbons with practically full conversion of the hydrocarbon feedstock, better selectivity with respect to the formation of methylbenzenes in the aromatic hydrocarbon concentrate, in particular xylenes, makes it possible to increase the catalyst's regeneration period by at least double (to 800 h), reduce the hydrocarbon feedstock conversion temperature by at least 15° C., and extend the catalyst's life cycle to 30-50 regenerations.

A variant of the invention exists in which a liquid hydrocarbon and water condenser is installed after the second reactor, serially connected to a three-phase product separator into reaction water, liquid hydrocarbons, and discharge gases. This makes it possible to increase the useful product yield through the possibility of recirculating the discharge gases.

A variant of the invention exists in which a liquid hydrocarbon and water condenser is installed after the first reactor, serially connected to a separator for separating liquid products fed to the three-phase separator. This makes it possible to perform intermediate removal of the liquid fraction and increase the aromatic hydrocarbon yield. Through intermediate separation of aromatic hydrocarbons, favorable conditions are created for their synthesis, which also reduces the recycling of olefin-containing fractions to reactor 1.

A variant of the invention exists in which discharge gases from the three-phase separator undergo stripping with removal of the natural gas liquids containing olefins. This makes it possible to remove 90% of the propane from the discharge gases, as well as ethylene. Deethanization of the NGL (distillation of some of the dissolved methane and ethane) is desirable, since it permits reduction of the circulation of ethane and methane that do not participate in the aromatization process.

A variant of the invention exists in which the benzene and/or benzene-toluene fraction is removed from the aromatic hydrocarbon concentrate and fed to the input of the first and/or second reactor. This makes it possible to increase alkylbenzene production further through recirculation of lower aromatic hydrocarbons, including benzene.

The combination of essential features of the claimed invention is unknown from the technological level for methods with similar purposes, which supports the conclusion that the invention as a method meets the novelty criterion.

Technological Level of the Installation

In another respect, the present invention relates to an installation for producing aromatic hydrocarbon concentrate from light aliphatic hydrocarbons, including two serially connected reactors, a first and second with pentasil-based zeolite catalysts, where the reactors differ in the conditions of conversion of hydrocarbons to aromatics, a unit for separating the mixture produced after the reaction zones into liquid and gaseous fractions, and the gaseous fraction output is connected to the inputs of the first and second reactors. Such an installation is described in RF Patent 2277524 of 2006. Said installation is the most similar in technical essence and has been selected as the prototype for the claimed invention as a device.

The disadvantage of the prototype invention is its low efficiency in producing aromatic hydrocarbon concentrate using the claimed installation, and its high concentration of benzene and naphthalenes and low concentration of alkylbenzenes in the resulting aromatic hydrocarbons. In addition, we can note the short period between regenerations of the catalysts used in the reactors, as well as the need to use more complex isothermal reactor equipment (reactors affording nearly isothermal conversion through delivery of heat to the reactor).

Disclosure of the Invention as an Installation

The present invention also has the goal of offering an installation for producing aromatic hydrocarbon concentrate from light aliphatic hydrocarbons and mixtures thereof with aliphatic alcohols, including two serially connected reactors, a first and second with pentasil-based zeolite catalysts, where the reactors differ in the conditions of conversion of hydrocarbons to aromatics, a unit for separating the mixture produced after the reaction zones into liquid and gaseous fractions, and the gaseous fraction output is connected to the inputs of the first and second reactors, permitting at least reducing of the aforementioned disadvantage.

To achieve this goal, the unit for separating the mixture into liquid and gaseous fractions contains a module for separating the gaseous fraction into hydrogen-containing gas and the natural gas liquids containing olefins. The installation additionally includes an oxygenate synthesis unit whose input is connected to the hydrogen-containing gas output of the gaseous fraction separation module, while the output of the oxygenate synthesis unit is connected to the inputs of the first and second reactors. This makes it possible to increase the yield of aromatic hydrocarbons as a whole and alkylbenzenes therein.

A variant of the invention exists in which the oxygenate synthesis unit includes a unit for producing synthesis gas, adapted to the production of synthesis gas using autothermal reforming technology. This makes it possible to increase the efficiency of oxygenate production in a circulating or flow-through scheme through intermediate production of synthesis gas with optimal $H_2/CO$ and $H_2/CO_2$ stoichiometric ratios for subsequent oxygenate synthesis.

A variant of the invention exists in which the oxygenate synthesis unit includes a unit for fine purification of discharge hydrogen-containing gas to remove sulfur compounds. This makes it possible to increase the useful yield of aromatic hydrocarbon concentrate through additional purification to remove undesirable impurities containing sulfur compounds, which are catalytic poisons for catalysts of hydrocarbon conversion to synthesis gas and oxygenate synthesis.

A variant of the invention exists in which the first and second reactors include a catalyst that contains a mechanical mixture of two zeolites, the first of which is characterized by a silicate modulus $SiO_2/Al_2O_3=20$ and is pretreated with an aqueous alkali solution and modified by rare-earth oxides in quantities of 0.5-2.0% by wt. of the weight of the first zeolite, while the second is characterized by a silicate modulus $SiO_2/Al_2O_3=82$, contains residual quantities of sodium oxide 0.04% by wt. of the weight of the second zeolite, and is modified by magnesium oxide in a quantity of 0.5-5.0% by wt. of the weight of the second zeolite, where the zeolites are used in a mass ratio of 1.7/1 to 2.8/1, and the binder contains at least silica and is used in a quantity of 20-25% by wt. of the weight of the catalyst. This advantageous characteristic makes it possible to achieve a higher yield of aromatic hydrocarbons with practically full conversion of the hydrocarbons and better selectivity with respect to the formation of alkylbenzenes in the aromatic hydrocarbon concentrate.

A variant of the invention exists in which the installation additionally includes a liquid hydrocarbon and water condenser installed after the first reactor and before the second reactor and a separator for separating the liquid fraction. This makes it possible to perform intermediate removal of the liquid fraction and increase arene production. (Through separation of aromatic hydrocarbons, more favorable conditions are created for their synthesis, which also reduces the recycling of the olefin-containing fraction to reactor 1.)

A variant of the invention exists in which the installation additionally includes a liquid hydrocarbon and water condenser installed after the second reactor, serially connected to a three-phase conversion product separator into reaction water, liquid hydrocarbons, and discharge gases. This makes it possible to extract the liquid hydrocarbon fraction and remove reaction water.

A variant of the invention exists in which the installation additionally includes a module for stripping discharge gases for removal of the natural gas liquids containing olefins, installed after the three-phase separator. This advantageous characteristic makes it possible to remove 90% of the propane from the discharge gases, as well as ethylene. Deethanization of the natural gas liquids (distillation of at least some of the dissolved methane and ethane from the natural gas liquids) is desirable, since it permits reduction of the circulation of ethane and methane contained in the natural gas liquids that do not participate in the process.

A variant of the invention exists in which the installation additionally includes a circulation compressor installed after the three-phase separator. This makes it possible to reduce the costs of separating the discharge gases from the three-phase separator into hydrogen-containing gas and the natural gas liquids.

A variant of the invention exists in which the installation additionally includes a unit for removing the benzene and/or benzene-toluene fraction from the aromatic hydrocarbon concentrate, whose output is connected to the input of the first and/or second reactor. This advantageous characteristic makes it possible to increase alkylbenzene production further through recirculation of lower aromatic hydrocarbons.

The combination of essential features of the claimed invention is unknown from the technological level for devices with similar purposes, which supports the conclusion that the invention as an installation meets the novelty criterion.

BRIEF DESCRIPTION OF DRAWINGS

Other distinguishing features and advantages of the invention clearly follow from the specification which is presented below for illustration purposes and is not restrictive, with references to the attached figures, in which.

Figure 1:
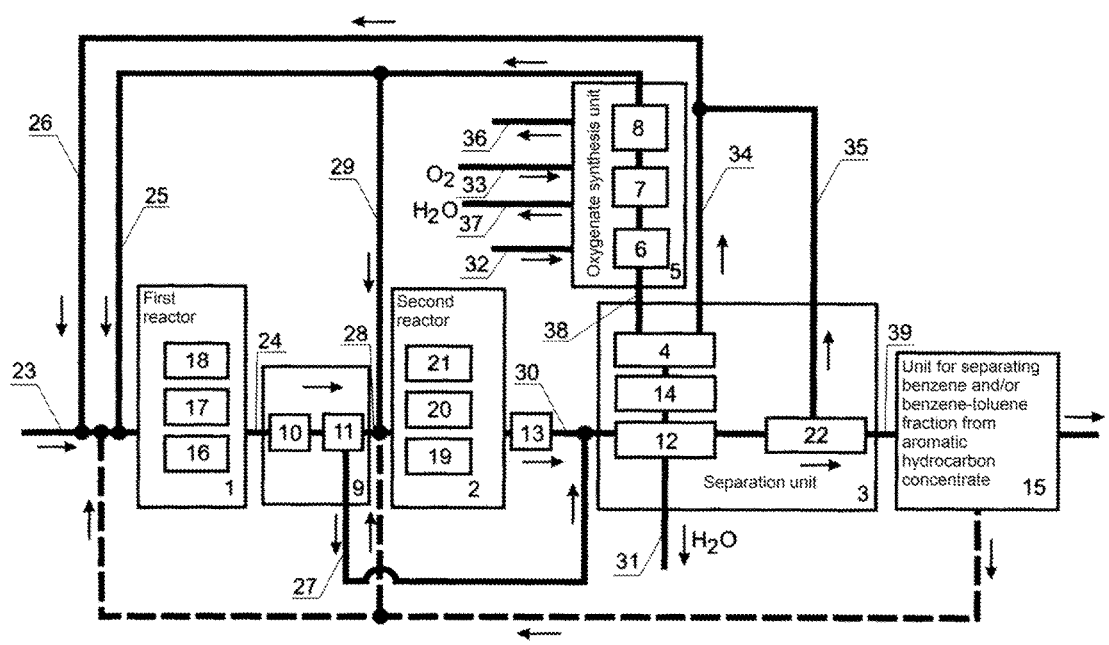
FIG. 1 schematically depicts the overall view of the installation for producing aromatic hydrocarbon concentrate from light aliphatic hydrocarbons and mixtures thereof with oxygenates according to the invention.
Figure 2:
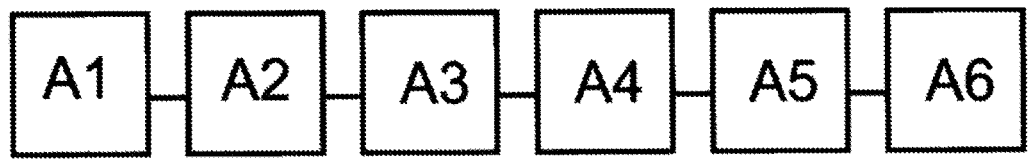
FIG. 2 schematically depicts the steps of the method of producing aromatic hydrocarbon concentrate from light aliphatic hydrocarbons and mixtures thereof with oxygenates according to the invention.

Pursuant to FIG. 1, the installation for producing aromatic hydrocarbon concentrate from light aliphatic hydrocarbons and mixtures thereof with $C_1$-$C_4$ aliphatic alcohols, including two serially connected reactors, a first reactor 1 and a second reactor 2 with pentasil-based zeolite catalysts, where reactors 1 and 2 differ in the conditions of conversion of hydrocarbons to aromatics, and unit 3 for separating the mixture obtained after the reaction zones into a liquid fraction containing $C_5$+ and water and a gaseous fraction containing $H_2$, $C_1$-$C_2$ and $C_2$-$C_5$, i.e., olefin-containing NGL. The NGL output is connected to the inputs of the first and second reactors.

Unit 3 for separating the mixture obtained at the output of the second reactor into liquid and gaseous fractions contains module 4 for separating the gaseous fraction into hydrogen-containing gas containing mainly hydrogen, methane, and ethane, and NGL containing $C_2$-$C_5$ olefins and paraffins.

The installation additionally includes oxygenate synthesis unit 5, whose input is connected to the hydrogen-containing gas output of gaseous fraction separation module 4, and the output of oxygenate synthesis unit 5 is connected to the input of the first and second reactors. Oxygenate synthesis unit 5 includes synthesis gas unit 6, adapted to the production of synthesis gas by autothermal reforming technology.

Oxygenate synthesis unit 5 also includes unit 7 for fine purification of discharge hydrogen-containing gas to remove sulfur compounds.

The purpose of unit 7 for fine purification to remove sulfur compounds is the chemosorptive or adsorptive purification of hydrogen-containing gas to remove sulfur compounds in order to meet requirements for sulfur content of crude hydrocarbons defined by requirements for prereforming, reforming, and oxygenate synthesis catalysts. In addition, oxygenate synthesis unit 5 includes unit 8 for oxygenate synthesis from synthesis gas by a flow-through and/or circulating scheme.

The preferable method of synthesizing oxygenates in oxygenate synthesis unit 5 is to obtain synthesis gas by autothermal refining technology, with subsequent oxygenate synthesis by a flow-through and/or circulating scheme.

Unit 6 consists of steam-oxygen (autothermal) conversion, prereforming, and heat recovery sections (not shown in FIG. 1). The purpose of the steam-oxygen (autothermal) conversion, pre-reforming, and heat recovery sections is to obtain synthesis gas by heating feedstock, mixing it with superheated steam, stabilizing the composition of the feedstock by adiabatic prereforming (adiabatic steam conversion and destructive hydrogenation of hydrocarbon feedstock), steam-oxygen or steam-air conversion of hydrocarbon feedstock, heat recovery, and steam condensation and dewatering.

Due to the presence of hydrogen in the initial hydrocarbon feedstock (stripped discharge gases), the H/C molar ratio for the initial hydrocarbon feedstock will be ≈4.5 (for methane, H/C=4), which ensures the production of synthesis gas using autothermal reforming technology with a stoichiometric ratio $f=(MF_{H_2}-MF_{CO_2})/(MF_{CO}+MF_{CO_2})\geq 2$ (MF="mole fraction") at a low ratio $MF_{CO_2}/MF_{CO}\leq 0.17$, which permits production of methyl alcohol with a concentration no less than 94% suitable for conversion to aromatic hydrocarbons without a concentration (distillation) stage. At lower ratios f<2, mixtures of methanol and $C_2$-$C_3$ aliphatic alcohols, as well as mixtures of alcohols with ethers, can be synthesized.

The purpose of unit 8 for oxygenate synthesis from synthesis gas is to produce oxygenates suitable for co-conversion with aliphatic hydrocarbons by a circulating or flow-through scheme. The most suitable method of oxygenate synthesis is oxygenate synthesis by a circulating scheme.

In addition, the ratio 2 will be met either if the mass fraction of carbon in the discharge gases is increased, which makes it possible to obtain methanol, or if the composition of discharge gases is altered while the activity of conversion catalysts declines during their service.

First and second reactors 1 and 2 include the catalyst claimed in the present invention, whose composition is described above.

The installation additionally includes unit 9 installed after first reactor 1 and before second reactor 2, consisting of liquid hydrocarbon and water condenser 10 and liquid fraction separator 11, which is connected to three-phase separator 12.

The installation additionally includes liquid hydrocarbon and water condenser 13 installed after second reactor 2, serially connected to three-phase separator 12 of conversion product to reaction water, liquid hydrocarbons and discharge gases.

The installation additionally includes module 14 installed after three-phase separator 12, designed to stabilize liquid hydrocarbons leaving 12, in which the light aliphatic hydrocarbon fraction (NGL) is distilled from the hydrocarbon condensate in addition to the fraction obtained in unit 4.

The installation additionally includes circulation compressor 14 installed after three-phase separator 12 and before gaseous fraction separation module 4.

The installation additionally includes unit 15 for extracting the benzene and/or benzene-toluene fraction from the aromatic hydrocarbon concentrate, whose output is connected to the input of first reactor 1 and/or second reactor 2.

Reactor 1 is designed for aromatization of a mixture of saturated and unsaturated aliphatic hydrocarbons and oxygenates. It contains at least one hydrocarbon feedstock heater 16, at least one hydrocarbon feedstock mixer 17, and at least one reaction zone 18.

By "reaction zone" here, we mean the entire reactor space in which hydrocarbon conversion occurs, including that which is divided into separate segments. The reactor may be a multi-bed type, for example, with mixing of streams within the reactor. It may have several mixing and feedstock feed zones. The reactor may also be tubular with catalyst contained in the reaction tubes, etc. The conversion feedstock is chosen so that exo- and endothermal reactions proceed efficiently, which affords several aforementioned advantages.

During conversion of hydrocarbons to aromatic hydrocarbon concentrate, fixed-bed reactors with periodic catalyst regeneration or fluidized-bed catalytic reactors with continuous catalyst regeneration are used.

Reactor 2 is designed for aromatization of a mixture of saturated and unsaturated aliphatic hydrocarbons and oxygenates and contains at least one hydrocarbon feedstock heater 19, at least one hydrocarbon feedstock mixer 20, and at least one reaction zone 21.

Unit 3 for separating the conversion products into reaction water, hydrogen-containing gas, stable aromatic hydrocarbon concentrate, and the natural gas liquids contains a three-phase conversion product separator for reaction water, liquid hydrocarbons, and discharge gases, as well as a module for stripping discharge gases from the three-phase separator, which permits extraction of the natural gas liquids containing olefins from the discharge gases. Unit 3 may also contain circulation compressor 14.

To maximize the AHCC yield, the discharge gas stripping module must afford extraction of 90% of the propane from the discharge gases. Deethanization of the natural gas liquids (distillation of at least part of the dissolved methane and ethane from the natural gas liquids) is desirable, since it permits reduction of the circulation of ethane and methane which are contained in the natural gas liquids and do not participate in the process.

EMBODIMENT OF THE INVENTION

Aromatic hydrocarbon production according to the invention proceeds as follows.

Step A1. The natural gas liquids or mixtures thereof with $C_1$-$C_4$ aliphatic alcohols are fed to reactor 1 of the installation. The preferred feedstock is a propane-butane fraction containing 70-80% propane, as well as circulating aliphatic saturated and unsaturated hydrocarbons from unit 3 and oxygenates from unit 5. The hydrocarbons are evaporated and thoroughly mixed. To increase the alkylbenzene content of the produced aromatic hydrocarbon concentrate, the benzene or benzene-toluene fraction, including that containing aliphatic hydrocarbons, may also be fed to reactor 1 (without an extractive distillation stage to remove aliphatic hydrocarbons).

Step A2. A mixture consisting of PBF or NGL hydrocarbon feedstock, recirculating olefin-containing NGL, and oxygenates is converted in reaction zone 1 in the gaseous phase. The unsaturated aliphatic hydrocarbons recycled from unit 3 are nearly completely dehydrocyclized, oxygenate vapors are totally converted, and part of the saturated aliphatic hydrocarbons, both circulating and arriving with the feedstock stream, are converted.

Step A3. The conversion product from reactor 1 is fed to reactor 2, to which oxygenates from unit 5 are also fed. In reactor 2, the incoming mixture from the output of reactor 1, which is thoroughly mixed with oxygenate vapors arriving from unit 5, undergoes gas-phase conversion. To increase the concentration of alkylbenzenes in the produced aromatic hydrocarbon concentrate, the benzene or benzene-toluene fraction, including that containing aliphatic hydrocarbons, may also be fed to reactor 2 (without an extractive distillation stage to remove aliphatic hydrocarbons).

Step A4. Additionally, with the aid of hydrocarbon and liquid condenser 10, where the liquid part of the conversion product ($C_5$+ and reaction water) condenses, and with the aid of separator 11, the gaseous part of the product is fed to reactor 2, while the liquid part of the product is removed and fed immediately to unit 3. The presence of condenser 10 and separator 11 permits reduction of the hydrocarbon circulation because in reactor 2, the extraction of aromatic hydrocarbons creates more favorable conditions for synthesis of aromatic hydrocarbons, which reduces recycling of the olefin-containing fraction to reactor 1.

Step A5. The conversion product from reactor 2 is fed through hydrocarbon and water condenser 13 in a mixture with hydrocarbon condensate from unit 11 (or without mixing) to unit 3. There, it is separated into reaction water to be recycled and unstable hydrocarbon condensate entering separation unit 22, where the latter is separated into a $C_{5+}$ or $C_{6+}$ hydrocarbon fraction and $C_2$-$C_5$ natural gas liquids. The discharge gases, with the aid of module 4, are separated into hydrogen-containing gas, which is fed to unit 5 for conversion to oxygenates, and the natural gas liquids containing olefins, which together with the natural gas liquids from separation unit 22 are recycled to reactor 1. The ratio of the circulating natural gas liquids from reactor 2 to the feedstock ranges from 0.3:1 to 1:1, depending on the composition of the feedstock. The ratio of oxygenates to the hydrocarbon feedstock is 1:1-1:4.

Step A6. The temperature at the outlet of each reaction zone in reactors 1 and 2 is controlled by the oxygenate flow rate. The pressure in the reaction zones is 0.5-2.5 MPa.

Temperatures are from 400° C. to 520° C. Thermostabilization of the reaction zone of reactor 2 is fully or partially effected by the heat capacity of the conversion feedstock and the presence in the conversion mixture of oxygenates, whose conversion to aromatic hydrocarbons and methylbenzenes or alkylbenzenes releases heat, and paraffins, whose conversion to aromatic hydrocarbons consumes heat.

The oxygenates are distributed between reaction zones 1 and 2 so as to ensure adiabatic heating of the feedstock in the reaction zone of reactor 1 to 400-500° C. and in the second to 450-520° C., respectively, and excess oxygenates from unit 5 can be discarded.

In reactors 1 and 2, endothermal reactions of saturated aliphatic hydrocarbon conversion to aromatic hydrocarbon concentrate, exothermal reactions of oxygenate aromatization, and exothermal reactions of aromatic compound alkylation occur. As a result, adiabatic conditions can be maintained in each reaction zone of reactors 1 and 2, which permits simple reactor equipment to be used, even without the use of additional heat supply/removal from the reaction zone.

The figure additionally designates the following channels:
- 23: feedstock feed to reactor 1;
- 24: conversion output from reactor 1;
- 25: connection of the output of oxygenate synthesis unit 5 to the input of first reactor 1 for oxygenate feed;
- 26: connection of the output of unit 4 to the input of first reactor 1 for NGL feed;
- 27: connection of unit 11 to the input of separation unit 3 for water-hydrocarbon condensate feed;
- 28: connection of the output of unit 9 to the input of second reactor 2 for discharge gas feed;
- 29: connection of the output of oxygenate synthesis unit 5 to the input of second reactor 2 for oxygenate feed;
- 30: connection of the output of unit 13 to the input of separation unit 3 for conversion product and condensate feed;
- 31: removal of reaction water from separation unit 3;
- 32: boiler-quality water feed to the input of oxygenate synthesis unit 5;
- 33: oxygen feed to the input of oxygenate synthesis unit 5;
- 34: output from unit 4 to the connection unit from streams 35 for NGL feed from discharge gases;
- 35: connection of the output from separation unit 22 to channel 34-26 for arene concentrate stabilization gas feed;
- 36: output from oxygenate synthesis unit 5 for hydrogen containing gas (HCG) purge feed;
- 37: condensation water feed to the input of oxygenate synthesis unit 5;
- 38: HCG feed from unit 4 to unit 5;
- 39: arene concentrate stabilization gas feed from unit 3 to unit 15.

The sequence of steps is illustrative and permits some operations to be reordered, added, or performed simultaneously without loss of the capability of producing aromatic hydrocarbon concentrate from natural gas liquids.

INDUSTRIAL APPLICABILITY

The claimed installation for producing aromatic hydrocarbon concentrate from light aliphatic hydrocarbons may be embodied in practice, and when embodied it affords realization of the claimed purpose, which supports the conclusion that the invention meets the industrial applicability criterion.

In accordance with the claimed invention, calculations of the method of operation of the installation for producing aromatic hydrocarbon concentrate from light aliphatic hydrocarbons have been performed with the following process parameters: pressure 0.5-1.5 MPa; temperature according to specification; rate of oxygenate feed to reaction zones $W=1$ to $2\ h^{-1}$ (in liquid); rate of aliphatic hydrocarbon feed to reaction zones $W=200$ to $1500\ h^{-1}$ (in gas).

According to the technological process modeling data, the process claimed in this invention is highly efficient, permitting production of up to 820 kg of aromatic hydrocarbons from a metric ton of liquefied hydrocarbon gases containing 80% propane, and up to 900 kg of aromatic hydrocarbons from a metric ton of butanes, exceeding the stated parameters for processes for producing aromatic hydrocarbons by catalytic reforming of naphtha (accounting for the recycling of aliphatic hydrocarbons separated from the reformate to the reforming stage, the aromatic hydrocarbon yield is no more than 75% of the feedstock) and by Cyclar® technology (a joint development of BP and UOP), the aromatic hydrocarbon yield is up to 66% from n-butane, and no more than 60% from propane, and the AHCC yield is 53% according to data presented in the prototype specification.

Another distinguishing feature of the process is the increased yield of alkylbenzenes, in particular xylenes, which permits the use of the resulting aromatic hydrocarbon concentrate to produce xylenes, in particular paraxylene. The product made using Cyclar® technology contains 20-23% xylenes, and a similar concentration is claimed in the specification of the invention prototype.

The Advantages of the Technological Solution are:
high aromatic hydrocarbon yield, 82-90%;
elevated content of alkylbenzenes, including xylenes, in the aromatic hydrocarbon concentrate, ~40%;
simplified reactor equipment design due to the offsetting thermal effect in conversion of hydrocarbon mixtures. This solution permits use of a simple reactor for conversion, avoidance of local superheating of the catalyst, and stabilization of the catalyst's productivity across its bed, which reduces the volume of the reaction zone;
possibility of separating high-added-value byproducts, for example paraxylene, from the synthesis products;
low aliphatic hydrocarbon content in the aromatic hydrocarbon concentrate, ~1% for conversion of propane-butane fractions;
possibility of involving benzene fractions (including mixtures containing aliphatics) in the process for further conversion to alkylbenzenes;
possibility of recycling discharge hydrogen-containing gas from other processes, including processes of refining aromatic hydrocarbon concentrate to marketable aromatic hydrocarbons;
possibility of adjusting the oxygenate feed to reactors 1 and 2 to maintain the required process temperature;
possibility of using oxygenates for co-conversion;
possibility of reducing the propane conversion temperature by at least 15° C.;
reduction in naphthalene content in the conversion product compared to the option of converting $C_3$-$C_4$ paraffins alone;
two- to three-fold increase in time between regenerations compared to conversion of $C_3$-$C_5$ paraffins alone.

Additional technical results are:
recycling of discharge gases from synthesis of arenes;
stabilization of the yield of aromatic hydrocarbon concentrate in case of variation in feedstock composition and catalyst deactivation;
increased aromatic hydrocarbon concentrate yield;
simplification of reactor equipment design;
reduction in energy costs due to reduction in circulation of aliphatic hydrocarbons from feedstock and conversion product;
improved efficiency in the use of discharge gases from neighboring and main processes to increase the marketable product yield;
diversification of feedstock: transition from expensive feedstock (naphtha) to cheaper feedstock (NGL).

Thus, this invention achieves its stated objective of improving the efficiency of aromatic hydrocarbon concentrate production and increasing selectivity with respect to alkylbenzenes, in particular xylenes.

The distinguishing features and advantages of the invention also follow from the tables, which are presented below for illustration and are not restrictive, in which:

Table 1 tabulates a comparison of product yields;
Table 2 tabulates the material and component balance of the claimed method;
Table 3 tabulates data on co-aromatization of propane, n-butane, and a mixture of propane, propene, butanes, butenes, and oxygenates (methanol and isopropanol).

TABLE 1

Product Yield Comparison

| Technology | Naphtha Reforming | Propane Conversion, Cyclar® Process | Prototype, Conversion of Butane Fraction | Present Patent, Conversion of PBF (80% Propane) |
|---|---|---|---|---|
| Benzene, % | 6 | 27 | 14 | 3 |
| Toluene, % | 21 | 43 | 45 | 35 |
| Xylenes and ethylbenzene, % | 20 | 20 | 23 | 40 |
| Higher aromatics, % | 20 | 9 | 11 | 21 |
| Nonaromatic compounds, % | 33 | 1 | 7 | 1 |
| AHCC yield, % | 78 | 60 | 53 | 82 |

TABLE 2

Material and Component Balance
Without Use of Additional Unit 11

| Stream/Unit Designation on Diagram | Name of Stream | From-To/ Remark | Total, ×1000 tons/ yr | CO and $CO_2$ | $H_2O$ | Methanol | $H_2$ | $C_1$-$C_2$ | $C_3$-$C_4$ | $C_{5+}$ Aliphatics | Aromatics | Ar and $N_2$ | $O_2$ |
|---|---|---|---|---|---|---|---|---|---|---|---|---|---|
| Reactor 1 | | | | | | | | | | | | | |
| Reactor 1 | Entered reactor 1, total: | | 1025 | 1 | 20 | 279 | 0 | 38 | 683 | 0 | 3 | 0 | 0 |
| 23 | PBF | Feedstock | 500 | 0 | 0 | 0 | 0 | 10 | 490 | 0 | 0 | 0 | 0 |
| 25 | Oxygenates | From unit 5 | 299 | 1 | 19 | 279 | 0 | 0 | 0 | 0 | 0 | 0 | 0 |

TABLE 2-continued

Material and Component Balance
Without Use of Additional Unit 11

| Stream/Unit Designation on Diagram | Name of Stream | From-To/ Remark | Total, ×1000 tons/ yr | CO and CO$_2$ | H$_2$O | Methanol | H$_2$ | C$_1$-C$_2$ | C$_3$-C$_4$ | C$_{5+}$ Aliphatics | Aromatics | Ar and N$_2$ | O$_2$ |
|---|---|---|---|---|---|---|---|---|---|---|---|---|---|
| 26 | NGL | From unit 3 | 225 | 0 | 1 | 0 | 0 | 28 | 193 | 0 | 3 | 0 | 0 |
| | | | | | Including: | | | | | | | | |
| 34 | NGL from discharge gases | From unit 3 | 173 | 0 | 1 | 0 | 0 | 21 | 148 | 0 | 3 | 0 | 0 |
| 35 | Arene concentrate stabilization gases | From unit 3 | 53 | 0 | 0 | 0 | 0 | 7 | 45 | 0 | 0 | 0 | 0 |
| Reactor 1 | Received from reactor 1, total | | 1025 | 1 | 177 | 0 | 15 | 120 | 497 | 3 | 213 | 0 | 0 |
| 24 | Conversion product from reactor 1 | To unit 9 | 1025 | 1 | 177 | 0 | 15 | 120 | 497 | 3 | 213 | 0 | 0 |
| | | | | | Unit 9 | | | | | | | | |
| Unit 9 | Entered unit 5, total: | | 1025 | 1 | 177 | 0 | 15 | 120 | 497 | 3 | 213 | 0 | 0 |
| 24 | Conversion product from reactor 1 | To unit 9 | 1025 | 1 | 177 | 0 | 15 | 120 | 497 | 3 | 213 | 0 | 0 |
| Unit 9 | Received from unit 5, total: | | 1025 | 1 | 177 | 0 | 15 | 120 | 497 | 3 | 213 | 0 | 0 |
| 27 | Water-hydrocarbon (HC) condensate | To unit 3 | 455 | 0 | 175 | 0 | 0 | 3 | 68 | 2 | 207 | 0 | 0 |
| 28 | Discharge gases | To unit 2 | 570 | 1 | 2 | 0 | 15 | 117 | 428 | 1 | 6 | 0 | 0 |
| | | | | | Reactor 2 | | | | | | | | |
| Reactor 2 | Entered reactor 2, total: | | 814 | 2 | 17 | 229 | 15 | 117 | 428 | 1 | 6 | 0 | 0 |
| 29 | Oxygenates | From unit 5 | 245 | 1 | 15 | 229 | 0 | 0 | 0 | 0 | 0 | 0 | 0 |
| 28 | Discharge gases | From unit 9 | 570 | 1 | 2 | 0 | 15 | 117 | 428 | 1 | 6 | 0 | 0 |
| Reactor 2 | Received from reactor 2, total: | | 814 | 2 | 145 | 0 | 22 | 251 | 219 | 2 | 173 | 0 | 0 |
| | Conversion product from reactor 2 | To unit 13 | 814 | 2 | 145 | 0 | 22 | 251 | 219 | 2 | 173 | 0 | 0 |
| | | | | | Unit 3 | | | | | | | | |
| Unit 3 | Entered unit 3, total | | 1270 | 2 | 320 | 0 | 22 | 254 | 288 | 4 | 380 | 0 | 0 |
| 27 | Water-hydrocarbon condensate | From unit 9 | 455 | 0 | 175 | 0 | 0 | 3 | 68 | 2 | 207 | 0 | 0 |
| 30 | Conversion product and condensate thereof | From unit 13 | 814 | 2 | 145 | 0 | 22 | 251 | 219 | 2 | 173 | 0 | 0 |
| Unit 3 | Received from unit 3, total | | 1270 | 2 | 320 | 0 | 22 | 254 | 288 | 4 | 380 | 0 | 0 |
| 96 | Hydrogen-containing gas | To unit 5 | 313 | 1 | 0 | 0 | 22 | 226 | 63 | 0 | 0 | 0 | 0 |
| 34 + 35 total | NGL | To reactor 1 | 225 | 0 | 1 | 0 | 0 | 28 | 193 | 0 | 3 | 0 | 0 |
| 31 | Reaction water | Product | 320 | 0 | 320 | 0 | 0 | 0 | 0 | 0 | 0 | 0 | 0 |
| 39 | Stabilized arene concentrate | Product or to unit 15 | 411 | 0 | 0 | 0 | 0 | 0 | 30 | 3 | 377 | 0 | 0 |
| | | | | | Unit 5 | | | | | | | | |
| Unit 5 | Entered unit 5, total | | 786 | 1 | 210 | 0 | 22 | 226 | 63 | 0 | 0 | 2 | 261 |
| 32 | Boiler-quality water | Feed-stock | 210 | 0 | 210 | 0 | 0 | 0 | 0 | 0 | 0 | 0 | 0 |
| 33 | Oxygen | Feed-stock | 263 | 0 | 0 | 0 | 0 | 0 | 0 | 0 | 0 | 2 | 261 |
| 38 | HCG | From unit 3 | 313 | 1 | 0 | 0 | 22 | 226 | 63 | 0 | 0 | 0 | 0 |

TABLE 2-continued

Material and Component Balance
Without Use of Additional Unit 11

| Stream/Unit Designation on Diagram | Name of Stream | From-To/ Remark | Total, ×1000 tons/ yr | CO and $CO_2$ | $H_2O$ | Methanol | $H_2$ | $C_1$-$C_2$ | $C_3$-$C_4$ | $C_{5+}$ Aliphatics | Aromatics | Ar and $N_2$ | $O_2$ |
|---|---|---|---|---|---|---|---|---|---|---|---|---|---|
| Unit 5 | Received from unit 4, total | | 787 | 29 | 197 | 510 | 11 | 39 | 0 | 0 | 0 | 2 | 0 |
| 37 | Condensation water | Product | 163 | 0 | 163 | 0 | 0 | 0 | 0 | 0 | 0 | 0 | 0 |
| 25 + 29 total | Oxygenates | To reactors 1 and 2 | 544 | 1 | 34 | 508 | 0 | 1 | 0 | 0 | 0 | 0 | 0 |
| 36 | HCG discharge | Product | 80 | 28 | 0 | 2 | 11 | 38 | 0 | 0 | 0 | 2 | 0 |
| | | | | Installation As a Whole | | | | | | | | | |
| | Total feedstock | | 973 | 0 | 210 | 0 | 0 | 10 | 490 | 0 | 0 | 2 | 261 |
| 23 | PBF | Feed-stock | 500 | 0 | 0 | 0 | 0 | 10 | 490 | 0 | 0 | 0 | 0 |
| 32 | Boiler-quality water | Feed-stock | 210 | 0 | 210 | 0 | 0 | 0 | 0 | 0 | 0 | 0 | 0 |
| 33 | Oxygen 99% | Feed-stock | 263 | 0 | 0 | 0 | 0 | 0 | 0 | 0 | 0 | 2 | 261 |
| | Total products | | 973 | 28 | 482 | 2 | 11 | 38 | 30 | 3 | 377 | 2 | 0 |
| 31 | Reaction water | Product | 320 | 0 | 320 | 0 | 0 | 0 | 0 | 0 | 0 | 0 | 0 |
| 37 | Condensation water | Product | 163 | 0 | 163 | 0 | 0 | 0 | 0 | 0 | 0 | 0 | 0 |
| 39 | Stabilized arene concentrate | Product | 411 | 0 | 0 | 0 | 0 | 0 | 30 | 3 | 377 | 0 | 0 |
| 36 | HCG discharge | Product | 80 | 28 | 0 | 2 | 11 | 38 | 0 | 0 | 0 | 2 | 0 |

TABLE 3

Data on Co-Aromatization of Propane, n-Butane,
and a Mixture of Saturated and Unsaturated $C_3$-$C_4$ Hydrocarbons
and Oxygenates

| | Example Number | | |
|---|---|---|---|
| | 1 | 2 | 3 |
| Temperature, ° C. | 490 | 515 | 450 |
| Pressure, atm. | 8 | 8 | 6 |
| Volumetric gas flow rate, $hr^{-1}$ | 300 | 300 | 1500 |
| TAKEN (ratio, % by wt.) | | | |
| Propane | | 76.9 | |
| n-Butane | 83.3 | | |
| Methyl alcohol | 16.7 | 23.1 | |
| Isopropyl alcohol | | | 26.5 |
| NGL ($C_3$-$C_4$ fraction, 50% olefins by wt.) | | | 73.5 |
| TOTAL: | 100 | 100 | 100 |
| Oxygenate conversion | 100 | 100 | 100 |
| AHCC yield per feedstock pass (per HC part of feedstock)*, % by wt. | 44.2* | 36* | 78.2* |
| $C_1$-$C_4$ Hydrocarbon Composition of Gas, % by wt. | | | |
| $CH_4$ | 11.1 | 28.1 | 6.9 |
| $C_2H_6$ | 9.7 | 12.4 | 21.0 |
| $C_2H_4$ | 5.6 | 6.1 | 3.3 |
| $C_3H_8$ | 38.7 | 24.1 | 32.4 |
| $C_3H_6$ | 5.1 | 8 | 4.5 |
| $i$-$C_4H_{10}$ | 3.8 | 7.9 | 10.6 |
| $n$-$C_4H_{10}$ | 25.1 | 12.6 | 18.5 |
| $C_4H_8$ | 0.9 | 0.8 | 2.7 |
| Total, % by wt. | 100 | 100 | 100 |
| AHCC Composition, % by wt. | | | |
| Aliphatics | 1.3 | 0.9 | 8.2 |
| Benzene | 2.1 | 3.6 | 6.1 |
| Toluene | 32.4 | 36.3 | 32.2 |
| Xylenes + ethylbenzene | 42.1 | 38.7 | 36.4 |
| $C_{9+}$ alkylaromatics | 22.1 | 20.4 | 18.1 |
| Total aromatic HC in AHCC | 98.7 | 99 | 92.8 |

The invention claimed is:

1. An installation for producing aromatic hydrocarbon concentrate from light aliphatic hydrocarbons, the installation comprising:
   a serially connected first reactor and second reactor;
   a pentasil-based zeolite catalyst;
   the reactors configured whereby each reactor has different conditions of conversion of hydrocarbons to aromatics;
   a separation unit connected to receive an output mixture from the second reactor, whereby the separation unit separates the output mixture into a liquid fraction and gaseous fraction, and wherein the separation unit comprises a liquid fraction output and a gaseous fraction output;
   a line connecting the gaseous fraction output to the first and second reactors;
   the separation unit comprising a module for separating the gaseous fraction into hydrogen-containing gas and the natural gas liquids containing olefins, and wherein the separation unit comprises a hydrogen-containing gas output;
   a line connecting the hydrogen-containing output to an oxygenate synthesis unit to the first reactor, the second reactor or both the first and the second reactors;

wherein the catalyst in the first reactor comprises a mechanical mixture of two zeolites, the first of which is characterized by a silicate modulus $SiO_2/Al_2O_3=20$ and is pretreated with an aqueous alkali solution and modified by rare-earth oxides in quantities of 0.5-2.0% by wt. of the weight of the first zeolite, while the second is characterized by a silicate modulus $SiO_2/Al_2O_3=82$, contains residual quantities of sodium oxide 0.04% by wt. of the weight of the second zeolite, and is modified by magnesium oxide in a quantity of 0.5-5.0% by wt. of the weight of the second zeolite, where the zeolites are used in a mass ratio of 1.7/1 to 2.8/1, and the binder contains at least silica and is used in a quantity of 20-25% by wt. of the weight of the catalyst.

2. An installation for producing aromatic hydrocarbon concentrate from light aliphatic hydrocarbons, the installation comprising:
a serially connected first reactor and second reactor;
a pentasil-based zeolite catalyst;
the reactors configured whereby each reactor has different conditions of conversion of hydrocarbons to aromatics;
a separation unit connected to receive an output mixture from the second reactor, whereby the separation unit separates the output mixture into a liquid fraction and gaseous fraction, and wherein the separation unit comprises a liquid fraction output and a gaseous fraction output;
a line connecting the gaseous fraction output to the first and second reactors;
the separation unit comprising a module for separating the gaseous fraction into hydrogen-containing gas and the natural gas liquids containing olefins, and wherein the separation unit comprises a hydrogen-containing gas output;
a line connecting the hydrogen-containing output to an oxygenate synthesis unit to the first reactor, the second reactor or both the first and the second reactors;
wherein the catalyst in the second reactor comprises a mechanical mixture of two zeolites, the first of which is characterized by a silicate modulus $SiO_2/Al_2O_3=20$ and is pretreated with an aqueous alkali solution and modified by rare-earth oxides in quantities of 0.5-2.0% by wt. of the weight of the first zeolite, while the second is characterized by a silicate modulus $SiO_2/Al_2O_3=82$, contains residual quantities of sodium oxide 0.04% by wt. of the weight of the second zeolite, and is modified by magnesium oxide in a quantity of 0.5-5.0% by wt. of the weight of the second zeolite, where the zeolites are used in a mass ratio of 1.7/1 to 2.8/1, and the binder contains at least silica and is used in a quantity of 20-25% by wt. of the weight of the catalyst.

3. An installation for producing aromatic hydrocarbon concentrate from light aliphatic hydrocarbons, the installation comprising:
a serially connected first reactor and second reactor;
a pentasil-based zeolite catalyst;
the reactors configured whereby each reactor has different conditions of conversion of hydrocarbons to aromatics;
a separation unit connected to receive an output mixture from the second reactor, whereby the separation unit separates the output mixture into a liquid fraction and gaseous fraction, and wherein the separation unit comprises a liquid fraction output and a gaseous fraction output;
a line connecting the gaseous fraction output to the first and second reactors;
the separation unit comprising a module for separating the gaseous fraction into hydrogen-containing gas and the natural gas liquids containing olefins, and wherein the separation unit comprises a hydrogen-containing gas output;
a line connecting the hydrogen-containing output to an oxygenate synthesis unit to the first reactor, the second reactor or both the first and the second reactors;
wherein the installation comprises a liquid hydrocarbon and water condenser installed after the first reactor and before the second reactor and a separator for separating the liquid fraction.

4. An installation for producing aromatic hydrocarbon concentrate from light aliphatic hydrocarbons, the installation comprising:
a serially connected first reactor and second reactor;
a pentasil-based zeolite catalyst;
the reactors configured whereby each reactor has different conditions of conversion of hydrocarbons to aromatics;
a separation unit connected to receive an output mixture from the second reactor, whereby the separation unit separates the output mixture into a liquid fraction and gaseous fraction, and wherein the separation unit comprises a liquid fraction output and a gaseous fraction output;
a line connecting the gaseous fraction output to the first and second reactors;
the separation unit comprising a module for separating the gaseous fraction into hydrogen-containing gas and the natural gas liquids containing olefins, and wherein the separation unit comprises a hydrogen-containing gas output;
a line connecting the hydrogen-containing output to an oxygenate synthesis unit to the first reactor, the second reactor or both the first and the second reactors;
wherein the installation comprises a liquid hydrocarbon and water condenser installed after the second reactor, serially connected to a three-phase conversion product separator into reaction water, liquid hydrocarbons, and discharge gases.

5. An installation for producing aromatic hydrocarbon concentrate from light aliphatic hydrocarbons, the installation comprising:
a serially connected first reactor and second reactor;
a pentasil-based zeolite catalyst;
the reactors configured whereby each reactor has different conditions of conversion of hydrocarbons to aromatics;
a separation unit connected to receive an output mixture from the second reactor, whereby the separation unit separates the output mixture into a liquid fraction and gaseous fraction, and wherein the separation unit comprises a liquid fraction output and a gaseous fraction output;
a line connecting the gaseous fraction output to the first and second reactors;
the separation unit comprising a module for separating the gaseous fraction into hydrogen-containing gas and the natural gas liquids containing olefins, and wherein the separation unit comprises a hydrogen-containing gas output;
a line connecting the hydrogen-containing output to an oxygenate synthesis unit to the first reactor, the second reactor or both the first and the second reactors;
wherein the installation comprises a module for stripping discharge gas to recover the natural gas liquids containing olefins installed after the three-phase separator and a module for stabilizing hydrocarbon condensate to remove the natural gas liquids from the condensate.

6. An installation for producing aromatic hydrocarbon concentrate from light aliphatic hydrocarbons, the installation comprising:

a serially connected first reactor and second reactor;

a pentasil-based zeolite catalyst;

the reactors configured whereby each reactor has different conditions of conversion of hydrocarbons to aromatics;

a separation unit connected to receive an output mixture from the second reactor, whereby the separation unit separates the output mixture into a liquid fraction and gaseous fraction, and wherein the separation unit comprises a liquid fraction output and a gaseous fraction output;

a line connecting the gaseous fraction output to the first and second reactors;

the separation unit comprising a module for separating the gaseous fraction into hydrogen-containing gas and the natural gas liquids containing olefins, and wherein the separation unit comprises a hydrogen-containing gas output;

a line connecting the hydrogen-containing output to an oxygenate synthesis unit to the first reactor, the second reactor or both the first and the second reactors; wherein the installation comprises a circulation compressor installed after the three-phase separator.

* * * * *